US008121194B2

(12) United States Patent
Shima (10) Patent No.: US 8,121,194 B2
(45) Date of Patent: Feb. 21, 2012

(54) FAST MACROBLOCK ENCODING WITH THE EARLY QUALIFICATION OF SKIP PREDICTION MODE USING ITS TEMPORAL COHERENCE

(75) Inventor: Masato Shima, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 1806 days.

(21) Appl. No.: 11/303,824

(22) Filed: Dec. 16, 2005

(65) Prior Publication Data
US 2007/0140344 A1 Jun. 21, 2007

(51) Int. Cl.
*H04B 1/66* (2006.01)
(52) U.S. Cl. .................................. 375/240.16
(58) Field of Classification Search .................. None
See application file for complete search history.

(56) References Cited

U.S. PATENT DOCUMENTS 6,553,068 B1 * 4/2003 Wake et al. ............. 375/240.14
2006/0285594 A1 * 12/2006 Kim et al. ............... 375/240.16

* cited by examiner

*Primary Examiner* — Twyler Haskins
*Assistant Examiner* — Lennin Rodriguez
(74) *Attorney, Agent, or Firm* — Robert D. Marshall, Jr.; W. James Brady; Frederick J. Telecky, Jr.

(57) ABSTRACT

The latest video-coding standards achieve higher coding efficiency than the previous video standards, while increasing the complexity and the difficulty of encoding. In a skip macroblock prediction mode some coding parameters (such as motion vectors and residual) are not coded. Selecting skip macroblock prediction mode reduces the size of the encoded bitstream while possibly deteriorating image quality. Previously the selection of the skip prediction mode is performed after motion estimation process. This invention determines whether each macroblock should be encoded in skip macroblock prediction mode before motion estimation. This invention substantially reduces computational cost with a very small deterioration in coding efficiency.

4 Claims, 8 Drawing Sheets

300 — BEGIN: SKIP PREDICTION

301 — COMPUTE THE REFERENCE PICTURE FOR THE MACROBLOCK ($RefPic_{skip}$) AND MOTION VECTOR PREDICTORS ($MVP_{skip}$) FROM THE NEIGHBORING MOTION VECTOR INFORMATION

302 — COMPUTE THE MB COST VALUE ($COST_{MB\_SKIP}$)

303 — END: SKIP PREDICTION

FIG. 6

| OPTION | PARAMETER |
|---|---|
| PICTURE TYPE | FRAME CODING |
| MACROBLOCK TYPE | FRAME MACROBLOCK ONLY |
| INTRA FRAME PERIOD | 15 FRAMES |
| NUMBER OF B FRAMES | 0 (NOT USED AT ALL) |
| ENTROPY CODING | CAVLC |
| QUANTIZATION PARAMETER (QP) | 26 (FOR ANY CASES) |
| NUMBER OF REFERENCE FRAMES | 5 FRAMES AT MOST |
| MOTION SEARCH FRAMES | 16x16 PIXELS |
| LOOPFILTER | USED |
| MB_QP_delta | NOT USED |
| WEIGHTED PREDICTION | NOT USED |

FIG. 4

| FILE NAME | NUMBER OF FRAMES | IMAGE SIZE | NUMBER OF SKIPPED MACROBLOCKS WITH COST_SKIP_MB <=T_EARLY_SKIP | NUMBER OF P-MACROBLOCKS WITH COST_SKIP_MB <=T_EARLY_SKIP | NUMBER OF TOTAL P-MACROBLOCKS | ACCURACY OF EarlySkip METHOD (%) | EarlySkip APPLICABLE RATE (%) |
|---|---|---|---|---|---|---|---|
| akiyo_qcif.yuv | 300 | 176x144 | 15,672 | 15,689 | 27,720 | 99.9 | 56.6 |
| mother_qcif.yuv | 300 | 176x144 | 5,952 | 6,020 | 27,720 | 98.9 | 21.7 |
| coast_qcif.yuv | 300 | 176x144 | 1,573 | 1,731 | 27,720 | 90.9 | 6.2 |
| container_qcif.yuv | 300 | 176x144 | 6,509 | 6,565 | 27,720 | 99.1 | 23.7 |
| foreman_qcif.yuv | 300 | 176x144 | 1,354 | 1,512 | 27,720 | 89.6 | 5.5 |
| hall_qcif.yuv | 300 | 176x144 | 10,115 | 10,201 | 27,720 | 99.2 | 36.8 |
| news_qcif.yuv | 300 | 176x144 | 10,123 | 10,152 | 27,720 | 99.7 | 36.6 |
| silent_qcif.yuv | 300 | 176x144 | 6,783 | 6,818 | 27,720 | 99.5 | 24.6 |
| stefan_cif.yuv | 300 | 352X288 | 6,483 | 7,428 | 110,880 | 87.3 | 6.7 |
| mobile_cif.yuv | 300 | 352X288 | 1,837 | 2,031 | 110,880 | 90.4 | 1.8 |
| foreman_cif.yuv | 300 | 352X288 | 6,798 | 7,776 | 110,880 | 87.4 | 7.0 |
| coast_cif.yuv | 300 | 352X288 | 4,628 | 5,143 | 110,880 | 90.0 | 4.6 |
| container_cif.yuv | 300 | 352X288 | 20,623 | 21,160 | 110,880 | 97.5 | 19.1 |
| mother_cif.yuv | 300 | 352X288 | 26,114 | 26,620 | 110,880 | 98.1 | 24.0 |
| news_cif.yuv | 300 | 352X288 | 47,266 | 47,521 | 110,880 | 99.5 | 42.9 |
| bicycle.yuv | 150 | 704X480 | 989 | 1,470 | 184,800 | 67.3 | 0.8 |

FROM FIG. 5A

| cheer.yuv | 150 | 704X480 | 8,710 | 9,457 | 184,800 | 92.1 | 5.1 |
| football.yuv | 150 | 704X480 | 9,781 | 11,608 | 184,800 | 84.3 | 6.3 |
| mobile.yuv | 150 | 704X480 | 11,740 | 12,880 | 184,800 | 91.1 | 7.0 |
| flower.yuv | 150 | 704X480 | 8,492 | 9,462 | 184,800 | 89.7 | 5.1 |
| tennis.yuv | 150 | 704X480 | 24,104 | 26,157 | 184,800 | 92.2 | 14.2 |

*FIG. 7*

|  | WITHOUT EARLY SKIP | | | | WITH EARLY SKIP | | | |
| --- | --- | --- | --- | --- | --- | --- | --- | --- |
|  | bpp | Y(dB) | U(dB) | V(dB) | bpp | Y(dB) | U(dB) | V(dB) |
| akiyo_qcif.yuv | 0.09 | 39.10 | 41.37 | 42.44 | 0.09 | 39.19 | 41.47 | 42.54 |
| mother_qcif.yuv | 0.13 | 38.91 | 43.03 | 43.84 | 0.13 | 38.95 | 43.02 | 43.93 |
| coast_qcif.yuv | 0.28 | 32.99 | 42.95 | 44.24 | 0.28 | 33.01 | 42.95 | 44.26 |
| container_qcif.yuv | 0.13 | 36.96 | 42.17 | 42.08 | 0.13 | 36.84 | 42.06 | 41.92 |
| foreman_qcif.yuv | 0.28 | 36.35 | 40.87 | 41.72 | 0.29 | 36.37 | 40.96 | 41.76 |
| hall_qcif.yuv | 0.13 | 37.56 | 39.54 | 41.62 | 0.13 | 37.55 | 39.54 | 41.63 |
| news_qcif.yuv | 0.22 | 38.49 | 42.12 | 42.44 | 0.22 | 38.38 | 42.08 | 42.39 |
| silent_qcif.yuv | 0.22 | 36.73 | 39.90 | 40.88 | 0.22 | 36.69 | 39.88 | 40.89 |
| stefan_cif.yuv | 0.75 | 36.62 | 39.61 | 39.75 | 0.75 | 36.59 | 39.59 | 39.72 |
| mobile_cif.yuv | 0.80 | 34.55 | 36.98 | 36.80 | 0.81 | 34.64 | 37.04 | 36.86 |
| foreman_cif.yuv | 0.43 | 38.86 | 42.95 | 44.92 | 0.42 | 38.67 | 42.86 | 44.81 |
| coast_cif.yuv | 0.69 | 36.37 | 44.43 | 46.11 | 0.67 | 36.33 | 44.43 | 46.10 |
| container_cif.yuv | 0.17 | 37.36 | 44.04 | 44.22 | 0.18 | 37.53 | 44.31 | 44.48 |
| mother_cif.yuv | 0.17 | 41.89 | 46.02 | 47.11 | 0.16 | 41.73 | 45.92 | 46.96 |
| news_cif.yuv | 0.20 | 40.85 | 43.87 | 44.92 | 0.20 | 40.78 | 43.85 | 44.91 |
| bicycle.yuv | 1.53 | 36.19 | 38.62 | 39.54 | 1.51 | 36.13 | 38.57 | 39.51 |
| cheer.yuv | 1.11 | 35.23 | 37.02 | 37.50 | 1.09 | 35.12 | 36.89 | 37.34 |
| football.yuv | 0.93 | 37.14 | 40.67 | 42.29 | 0.92 | 36.93 | 40.57 | 42.20 |
| mobile.yuv | 0.99 | 34.60 | 37.98 | 38.19 | 0.94 | 34.47 | 37.87 | 38.07 |
| flower.yuv | 1.88 | 37.69 | 41.25 | 41.04 | 1.89 | 37.71 | 41.30 | 41.12 |
| tennis.yuv | 1.00 | 35.68 | 43.05 | 42.69 | 0.94 | 35.50 | 42.85 | 42.41 |

FIG. 8

|  | DIFFERENCE | | | | |
| --- | --- | --- | --- | --- | --- |
|  | bpp | BIT-RATE(%) | Y(dB) | U(dB) | V(dB) |
| akiyo_qcif.yuv | 0.00 | 0.00 | 0.09 | 0.10 | 0.09 |
| mother_qcif.yuv | 0.00 | 0.00 | 0.05 | 0.00 | 0.08 |
| coast_qcif.yuv | 0.00 | 0.00 | 0.02 | 0.00 | 0.02 |
| container_qcif.yuv | 0.00 | 0.00 | -0.11 | -0.12 | -0.17 |
| foreman_qcif.yuv | 0.01 | 3.57 | 0.02 | 0.09 | 0.04 |
| hall_qcif.yuv | 0.00 | 0.00 | -0.01 | 0.00 | 0.02 |
| news_qcif.yuv | 0.00 | 0.00 | -0.12 | -0.04 | -0.05 |
| silent_qcif.yuv | 0.00 | 0.00 | -0.04 | -0.03 | 0.02 |
| stefan_cif.yuv | 0.00 | 0.00 | -0.04 | -0.02 | -0.03 |
| mobile_cif.yuv | 0.01 | 1.25 | 0.10 | 0.06 | 0.06 |
| foreman_cif.yuv | -0.01 | -2.33 | -0.19 | -0.08 | -0.11 |
| coast_cif.yuv | -0.02 | -2.90 | -0.04 | 0.00 | -0.01 |
| container_cif.yuv | 0.01 | 5.88 | 0.17 | 0.27 | 0.26 |
| mother_cif.yuv | -0.01 | -5.88 | -0.15 | -0.10 | -0.15 |
| news_cif.yuv | 0.00 | 0.00 | -0.07 | -0.03 | -0.01 |
| bicycle.yuv | -0.02 | -1.31 | -0.06 | -0.05 | -0.03 |
| cheer.yuv | -0.02 | -1.80 | -0.11 | -0.13 | -0.16 |
| football.yuv | -0.01 | -1.08 | -0.21 | -0.11 | -0.09 |
| mobile.yuv | -0.05 | -5.05 | -0.13 | -0.11 | -0.12 |
| flower.yuv | 0.01 | 0.53 | 0.02 | 0.04 | 0.08 |
| tennis.yuv | -0.06 | -6.00 | -0.17 | -0.20 | -0.28 |
| MAX | 0.01 | 5.88 | 0.17 | 0.27 | 0.26 |
| MIN | -0.06 | -6.00 | -0.21 | -0.20 | -0.28 |
| AVERAGE | -0.01 | -0.72 | -0.05 | -0.02 | -0.03 |

FAST MACROBLOCK ENCODING WITH THE EARLY QUALIFICATION OF SKIP PREDICTION MODE USING ITS TEMPORAL COHERENCE

TECHNICAL FIELD OF THE INVENTION

The technical field of this invention is video compression, primarily to accelerate the video encoding process of H.264 video coding standard, but applicable to the encoding process of other coding standards.

BACKGROUND OF THE INVENTION

The H.264 video standard, also as known as MPEG-4 AVC, provides compression efficiency much higher than previous video coding standards, such as MPEG-2 and MPEG-4. In most video encoding algorithms, motion estimation (ME) is the most computationally expensive module. It is generally found that ME requires more than a half of the computational operations required for the whole encoding process. The H.264 video standard uses 7 types of motion search blocks (ranging from 4 by 4 to 16 by 16) and multiple reference pictures to achieve the higher compression efficiency. The MPEG-2 video standard uses only one type (16 by 16) of motion search block and a single reference picture. It is estimated that ME encoding module of the H.264 video standard requires much more computation than previous standards. Accordingly, some technique that will reduce the computation required for ME is needed.

In the H.264 video standard as well as many other video standards, each picture is divided into 16 by 16 pixels square partitions, called macroblocks. If inter-block prediction is allowed in the current picture, i.e. the current picture is P-picture or B-picture, each macroblock is further divided into motion search blocks whose size range from 16 by 16 pixels to 4 by 4 pixels. Each motion search block of the current picture can be predicted from the past or future reference pictures by estimating the motion between the current motion search block and the estimated block in the reference pictures. In order to choose the optimal motion vector, the cost value between the reference and the current motion search block is computed and compared. The cost value ($COST_{block}$) is usually measured by the summation of the sum of absolute error (SAE) and the cost of motion vector ($MV_{cost}$) defined as follows:

$$COST_{block}(x, y, p, N, M, mv_x, mv_y) =$$
$$SAE(x, y, p, N, M, mv_x, mv_y) + MV_{cost}(p, mv_x, mv_y)$$

$$SAE(x, y, p, N, M, mv_x, mv_y) =$$
$$\sum_{j=0}^{N-1}\sum_{i=0}^{M-1} |f_c(x+i, y+j) - f_p(x+mv_x+mvp_x+i, y+mv_y+mvp_y+j)|$$

where: SAE( . . . ) is the sum of absolute error between the current motion search block whose top-left corner is (x,y) in the current picture and the predicted block whose top-left corner is $(x+mvp_x+mv_x, y+mvp_y+mv_y)$ in the reference picture; $f_c(x,y)$ is the luminance samples (x,y) in the current picture; $f_p(x,y)$ is the luminance samples (x,y) in the reference picture; $mvp_x, mvp_y$ are the horizontal and vertical motion vector predictors which can be computed from the motion vectors of neighboring motion search blocks; $mv_x, mv_y$ are the horizontal and vertical motion vectors between the current and the predicted motion search block; N and M are the horizontal and vertical dimensions of the motion search block. The motion vector cost quantity $MV_{cost}(p, mv_x, mv_y)$ depends on the encoder implementation.

The SAE computation is performed in ME process within a macroblock with changing motion vectors, reference pictures, and motion search block size. After testing any combination of the motion search block size, the reference pictures and the motion vectors, the optimal combination is obtained by minimizing the cost value for the macroblock with the macroblock encoder quantity $ME(COST_{MB\_ME})$. This can be computed by summing up the cost value for all the motion search block within the macroblock as in the following equation:

$$COST_{MB\_ME}(x,y) = \Sigma COST_{block}( \ldots )$$

Meanwhile, the cost value of the macroblock with skip prediction mode (COST MB_SKIP) can be computed in a similar way as follows:

$$COST_{MB\_SKIP}(x, y) = SAE_{SKIP}(x, y)$$

$$SAE_{SKIP}(x, y) = \sum_{j=0}^{15}\sum_{i=0}^{15} |f_c(x+i, y+j) - f_{skip\_p}(x+mvp_{skip\_x}+i, y+mvp_{skip\_y}+j)|$$

where: $SAE_{skip}(x,y)$ is the sum of the absolute error between the current macroblock whose top-left corner is (x,y) in the current picture and the predicted macroblock whose top-left corner is labeled $x+mvp_{skip\_x}$, $y+mvp_{skip\_y}$ in the reference picture; $f_{skip\_p}(x,y)$ is the luminance samples (x,y) in the reference picture; $mvp_{skip\_x}$, and $mvp_{skip\_y}$ are the horizontal and vertical motion vector predictors which can be computed from the motion vectors of temporally or spatially neighboring macroblocks depending on the coding environment.

Figure 1:
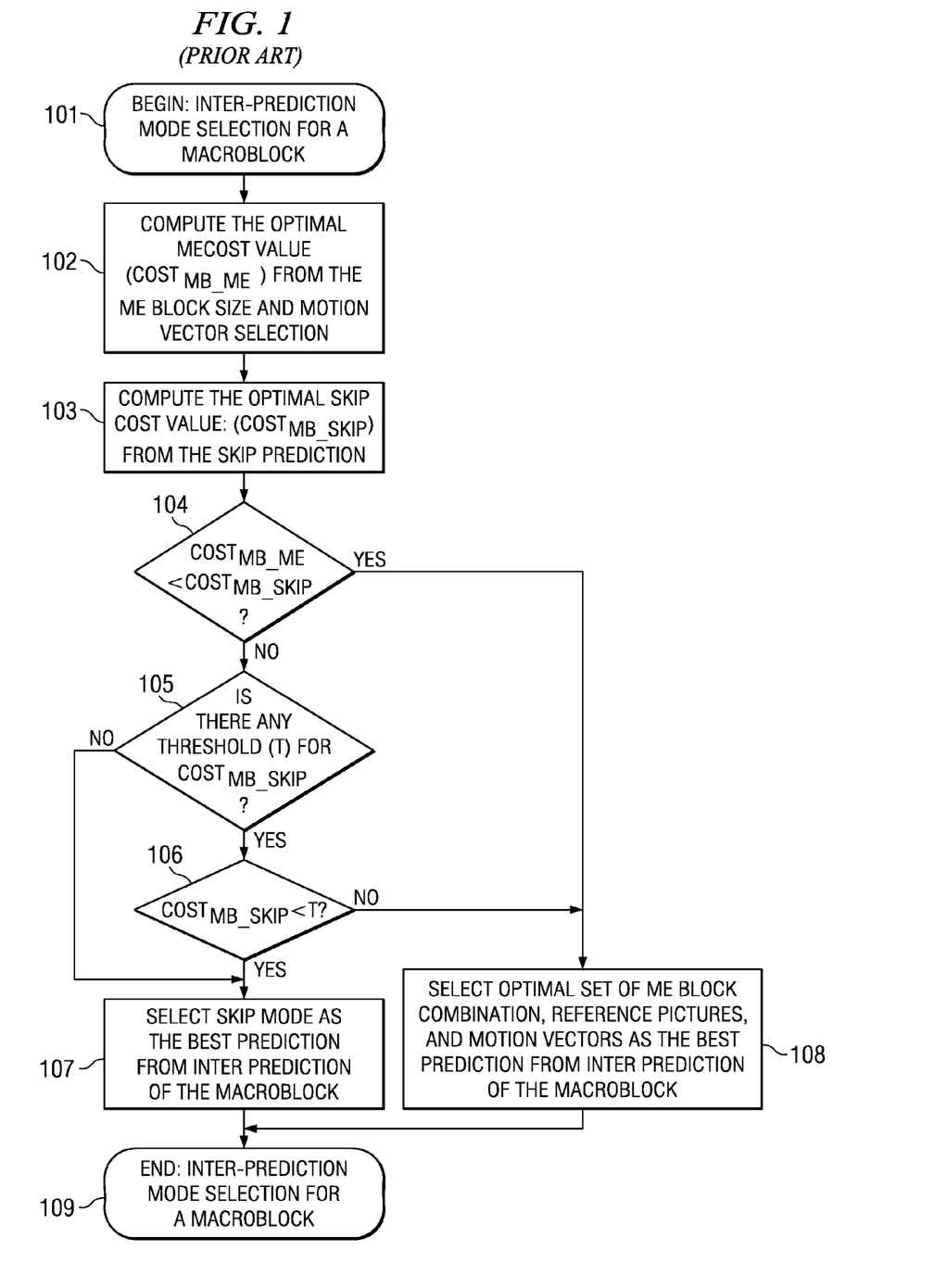
FIG. 1 illustrates the flowchart of a typical inter-prediction mode selection for a macroblock (Prior Art)
Figure 2:
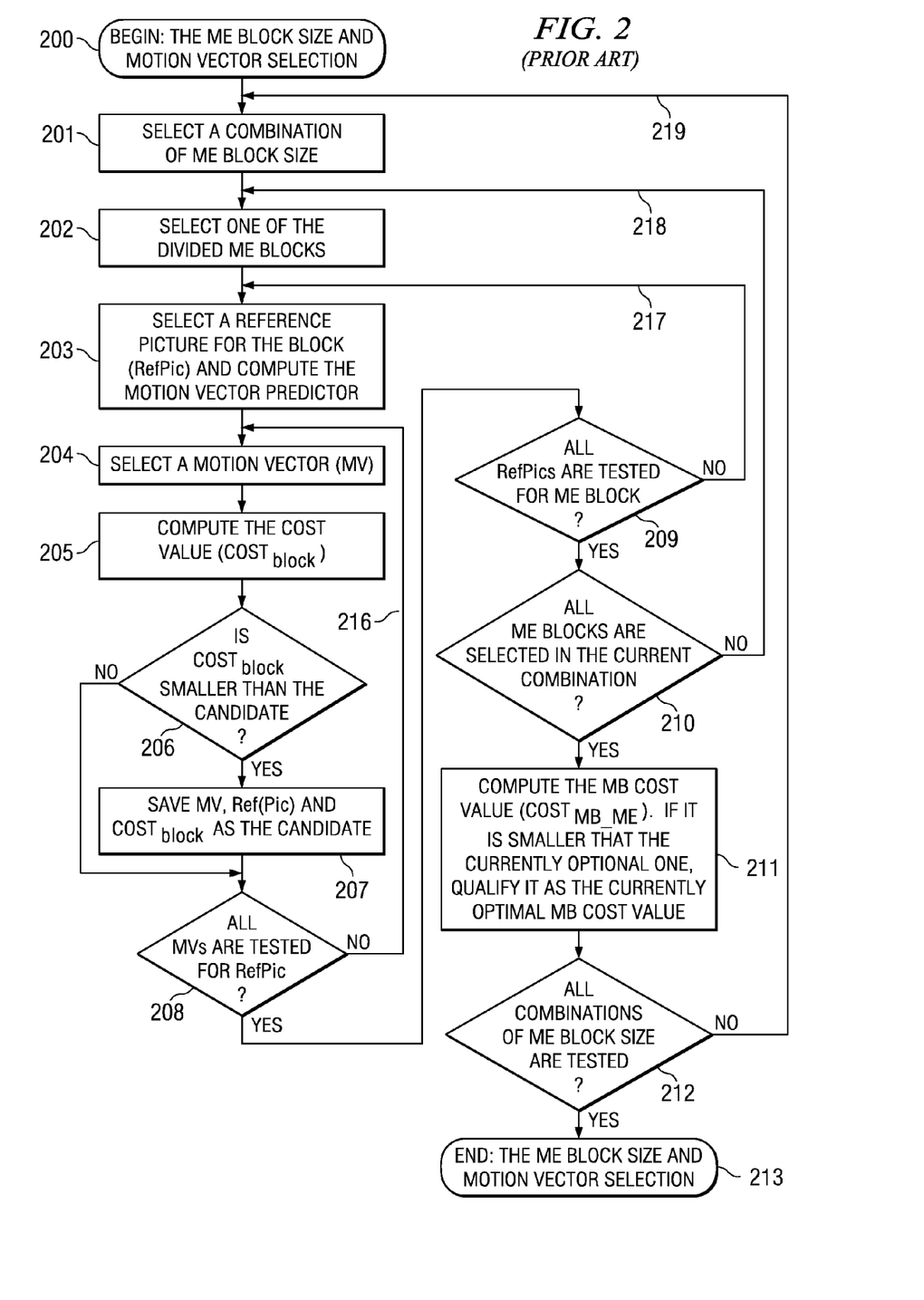
FIG. 2 illustrates the flowchart of motion estimation (ME) block size and motion vector selection (Prior Art)
Figure 3:
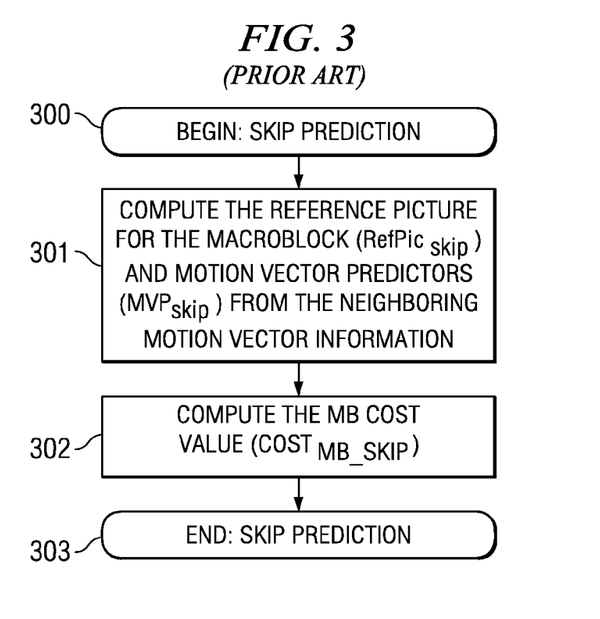
FIG. 3 illustrates the flowchart for skip prediction (Prior Art)

FIG. 1 through FIG. 3 illustrate the typical flowchart of the optimal inter-block prediction mode (ordinary ME mode or skip prediction mode) selection of macroblock encoding in the H.264 video standard. FIG. 1 illustrates the prior art flowchart of the inter-block prediction process beginning at block 101. In block 102 the optimal ME cost value $COST_{MB\_ME}$ is computed from ME block size and motion vector selection. In block 103 the optimal SKIP cost value $COST_{MB\_SKIP}$ is computed for the skip prediction mode. The optimal inter-block prediction mode is selected by comparing in test block 104 the optimal cost value for macroblock encoding $COST_{MB\_ME}$ to that with skip prediction mode macroblock encoding $COST_{MB\_SKIP}$. If $COST_{MB\_ME}$ is lower than $COST_{MB\_SKIP}$ then block 108 chooses the optimal set of ME block combination, reference pictures and motion vectors as the best prediction from the inter prediction of the macroblock. If $COST_{MB\_ME}$ is higher than $COST_{MB\_SKIP}$, then test block 105 is selected to determine if there is a threshold of $COST_{MB\_SKIP}$ compared to cost T. If a threshold exists test block 106 compares $COST_{MB\_SKIP}$ to cost T. If $COST_{MB\_SKIP}$ is more than threshold cost T in test block 106, then the flow proceeds to block 108, which chooses the optimal set of ME block combination, reference pictures and motion vectors as the best prediction from the inter prediction of the macroblock. If $COST_{MB\_SKIP}$ is less than threshold cost T in test block 106, then block 107 chooses the skip prediction mode as the best prediction from the inter prediction of the macroblock. If no threshold T was found in test block 105, then test block 106 is bypassed to block 107. Block 107 selects the skip prediction mode as the best prediction from inter-prediction of the macroblock. The end block 109 completes the inter prediction mode selection for the macroblock.

FIG. 2 illustrates a flowchart of the method to obtain the $COST_{MB\_ME}$ from the ME block size and motion vector selection process. FIG. 2 begins at block 200. FIG. 2 illustrates the process to compute the $COST_{MB\_ME}$ with the changing combinations of ME block size within a macroblock, reference pictures, and motion vectors. This process requires a large amount of computation and returns the optimal $COST_{MB\_ME}$ along with the optimal combination of ME block size, reference pictures, and motion vectors. In FIG. 2, the four processes are initiated, each of which involve potential multiple iterations as evidenced by re-circulate paths 216 through 219. The initial four processes are:

(A) select a combination of ME block size in block 201;
(B) select one of the divided ME blocks in block 202;
(C) select a reference picture for the block Ref(Pic) and compute the motion vector predictor in block 203; and
(D) select a motion vector MV in block 204.

From the four selections in blocks 201 to 204, the data is available for step 205 to compute the cost value of $COST_{block}$.

Test block 206 determines whether $COST_{block}$ is smaller than the candidate cost. If the result is Yes, then MV, Ref(Pic) and $COST_{block}$ are saved as the new candidate cost in block 207. If the result is NO, then MV, Ref(Pic) are tested further according to the prescriptions illustrated in test blocks 208, 209, and 210. A No result in any test block 208, 209, or 210 results in re-circulate via respective paths 216, 217, and 218 respectively. YES results in all test blocks 208, 209, and 210 allow the process to proceed without re-circulation to block 211. Block 211 computes the MB cost value $COST_{MB\_ME}$. If $COST_{MB\_ME}$ it is smaller than the currently optional one, then block 211 qualifies it as the currently optimal MB cost value. Finally test block 212 determines if all combinations of ME block size are tested. A YES result in test block 212, ends the algorithm steps with the completion of ME block size and motion vector selection in end block 213. A NO result in test block 212, initiates a major re-circulation via path 219. From FIG. 2, it can be seen that the conventional process flow for ME block size and motion vector selection is a most complex algorithm.

In contrast to the process of FIG. 2, $COST_{MB\_SKIP}$ can be obtained from the skip prediction process described in FIG. 3. The skip prediction process initiates in block 300. The reference picture for the macroblock $RefPic_{skip}$ and $MVP_{skip}$ are computed in block 301. From the information computed in block 301, block 302 computes the MB cost value $COST_{MB\_SKIP}$. The skip prediction computation concludes at end block 303.

In some implementations, the skip prediction mode will be selected (see 107 of FIG. 1) as the best inter-block prediction simply because the cost value with the skip prediction mode is the lowest. However, if the skip prediction mode is selected, it will skip coding not only the motion vector information but also the residual information. Accordingly, selecting skip prediction mode will reduce the output bit stream size, but will tend to deteriorate the image quality when compared to selecting other inter-block prediction modes if the cost values are equivalent. In order to minimize the image quality deterioration by selecting skip prediction mode, many implementations set the threshold value T to $COST_{MB\_SKIP}$ as described in test block 105 of FIG. 1. If T exists in the encoder and $COST_{MB\_SKIP}$ is larger than T, the optimal inter-block prediction with ME will be selected.

The fundamental concern here is that ME block size and motion vector selection, accomplished by the algorithm of FIG. 2, is a critical and time-consuming process. This makes it impractical to realize real-time encoding in most applications. Therefore, the computational reduction of ME block size and motion vector selection methodology providing high image quality and coding efficiency is desired.

SUMMARY OF THE INVENTION

The present invention describes a method for reducing the computation required for macroblock encoding (ME) in video compression by skipping redundant ME processes.

a) If previously encoded picture is available, obtain the prediction mode $MODE_{ref}$ and the cost value $COST_{ref}$ of locally the same macroblock in the previously encoded picture (i.e. spatially identical, but temporally adjacent macroblock).

b) Compute the cost value of the macroblock with skip prediction mode $COST_{MB\_SKIP}$ at first as described in FIG. 3.

c) If $MODE_{ref}$ from step a, is not skip prediction mode, go to step f).

d) Compute the threshold value $T_{EARLY\_SKIP}$, defined as $T_{EARLY\_SKIP} = K*COST_{ref}$, where K is the constant set by the encoder implementation.

e) Early determination: if $COST_{MB\_SKIP} \leq T_{EARLY\_SKIP}$, qualify skip prediction mode as the best inter-prediction mode $MODE_{current}$, and go to step h).

f) Perform ordinary motion estimation for the macroblock and compute the optimal cost value of the macroblock $COST_{MB\_ME}$ as described in FIG. 2.

g) Ordinarily determine the best inter-prediction mode $MODE_{current}$ by comparing $COST_{MB\_ME}$ with $COST_{MB\_SKIP}$ as described in FIG. 1. Use the threshold value for the skip prediction mode T if applicable.

h) Store the current optimal prediction mode $MODE_{current}$ and the optimal cost value either $COST_{MB\_ME}$ or $COST_{MB\_SKIP}$ as $MODE_{ref}$ and $COST_{ref}$ respectively for next early qualification.

BRIEF DESCRIPTION OF THE DRAWINGS

These and other aspects of this invention are illustrated in the drawings, in which.

DETAILED DESCRIPTION OF PREFERRED EMBODIMENTS

Figure 4:
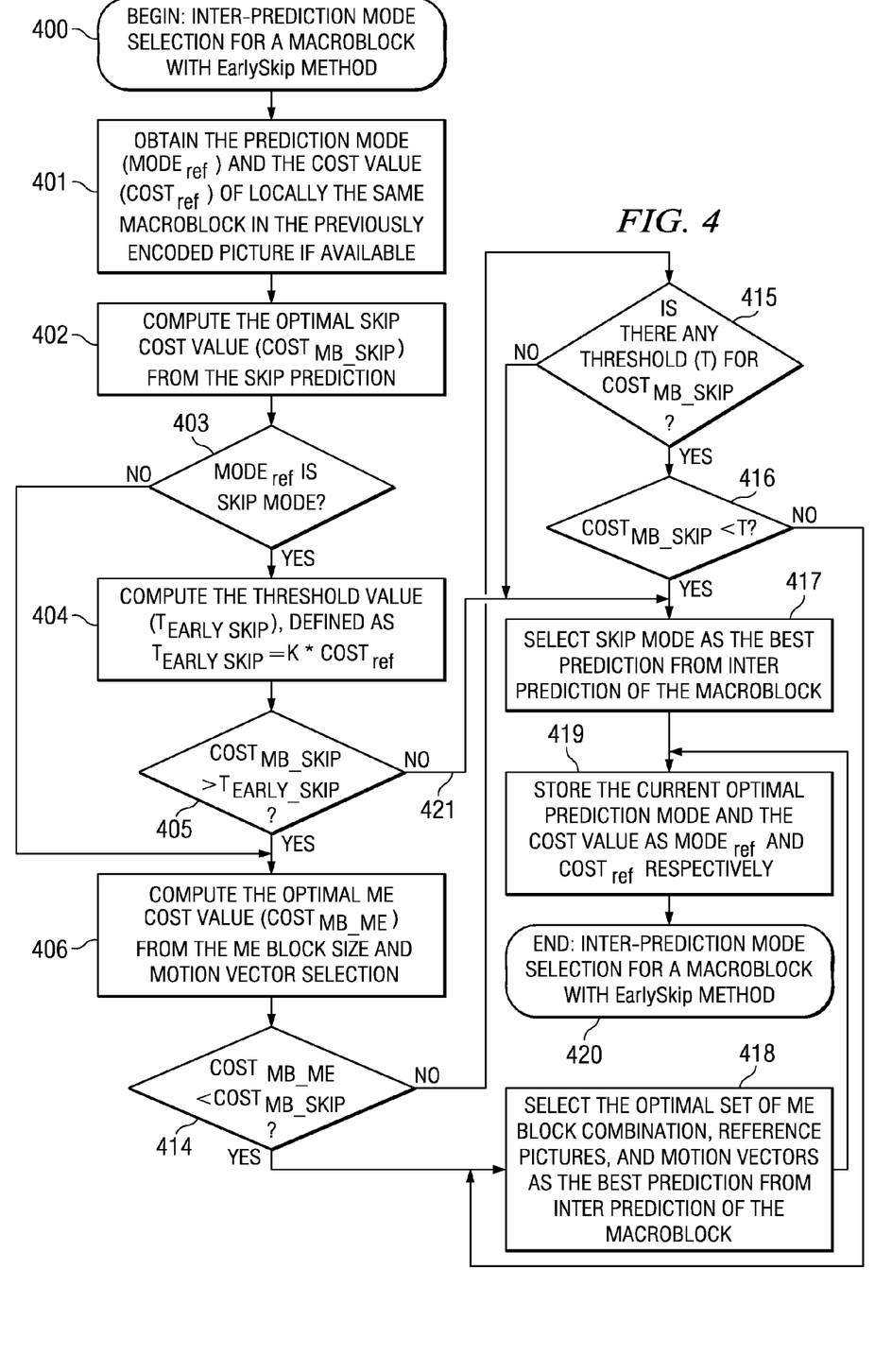
FIG. 4 illustrates the flowchart of inter-prediction mode selection for a macroblock with the EarlySkip method of this invention.

FIG. 4 illustrates the essential features of this invention. To clarify the descriptive text that follows it is useful to label the invented methodology as EarlySkip. This represents early qualification of skip prediction mode using its temporal coherence. The invention uses the coherence in prediction mode between the temporally neighboring macroblocks. In most video sequences, the spatially identical macroblocks in consecutive pictures tend to have the similar motion vectors. Meanwhile, the skip prediction mode tends to be selected when the macroblock has no motion or similar motion with the spatially neighboring macro-blocks.

If a temporary neighboring macroblock is coded with skip prediction mode, the current macroblock is also likely to be coded with skip prediction mode. Accordingly, the EarlySkip method will not be applied if the coding mode of the temporary neighboring macroblock is not skip prediction mode coding. An exception occurs when the object in the current macroblock starts to move suddenly and irregularly at the current picture. In this case, the cost value of the current macroblock with skip prediction mode $COST_{MB\_SKIP}$ should be much larger than that of the temporally neighboring macroblock $COST_{ref}$. Hence, it is necessary to proceed as follows:

1. Compute the threshold value $T_{EARLY\_SKIP}$, defined as $T_{EARLY\_SKIP}=K*COST_{ref}$ where K is the constant set by the encoder implementation;
2. Perform early determination: if $COST_{MB\_SKIP} \leq T_{EARLY\_SKIP}$, qualify skip prediction mode as the best inter-prediction mode $MODE_{current}$, and then proceed to step 3; and
3. Store the current optimal prediction mode $MODE_{current}$ and the optimal cost value either $COST_{MB\_ME}$ or $COST_{MB\_SKIP}$ as $MODE_{ref}$ and $COST_{ref}$ respectively for next early qualification.

Step 1 computes the threshold value for EarlySkip $T_{EARLY\_SKIP}$. Step 2 compares $T_{EARLY\_SKIP}$ to the cost value of the current macroblock with the skip prediction mode $COST_{MB\_SKIP}$. Consider the two possible results of the comparison:

Case A: If the cost value is larger, i.e. $COST_{MB\_SKIP} > T_{EARLY\_SKIP}$, there will be less possibility that the skip prediction mode is selected as the best inter-block prediction mode. In case A, the ordinary ME should be performed to retain the coding efficiency.

Case B: If the cost value is smaller than or equal to the threshold value for EarlySkip, i.e. $COST_{MB\_SKIP} \leq T_{EARLY\_SKIP}$, there will be high probability that the skip prediction mode is selected as the best inter-block prediction mode at last.

FIG. 4 illustrates the flow chart for inter-prediction mode for a macroblock using the EarlySkip method of this invention. Block 400 begins the method. Block 401 accesses $MODE_{ref}$ and $COST_{ref}$ of a similar local macroblock in previously encoded picture for comparison. Block 402 computes the optimal SKIP cost value $COST_{MB\_SKIP}$. The test in test block 403 determines if $MODE_{ref}$ is a skip prediction mode result. A Yes result in test block 403 begins the skip mode processing.

Block 404 computes the threshold value for EarlySkip $T_{EARLY\_SKIP}$. Block 405 compares this threshold value $T_{EARLY\_SKIP}$ with the cost value of the current macroblock with the skip prediction mode, i.e. is $COST_{MB\_SKIP} > T_{EARLY\_SKIP}$? If the cost value is smaller than or equal to the threshold (No in test block 405), then the process proceeds to select the skip prediction mode via path 421. In this case there will be high probability that the skip prediction mode is the best inter-block prediction mode. In this case, the method bypasses the most computationally expensive block 406 of FIG. 4, which corresponds to the process 102 of FIG. 1 and entire FIG. 2. This achieves significant computational reduction.

If the cost value is greater than the threshold $COST_{MB\_SKIP} > T_{EARLY\_SKIP}$ (Yes at test block 405), then this method enters the lower portion of the flow chart of FIG. 4. This corresponds to blocks 102 and 104 through 109 of FIG. 1.

Block 406 computes $COST_{MB\_ME}$, which corresponds to block 102 of FIG. 1. Test block 414 determines the relative cost $COST_{MB\_ME} < COST_{MB\_SKIP}$. If $COST_{MB\_ME} \geq COST_{MB\_SKIP}$ (No at test block 414), then test block 415 evaluates if there is a threshold of $COST_{MB\_SKIP}$ compared to cost T. If a threshold exists (YES at test block 415), then test block 416 evaluates $COST_{ME\_ME} < T$? If no threshold T was found in test block 415 (NO at test block 415), then test block 416 is bypassed to block 417.

If $COST_{MB\_SKIP} \geq T$ (NO in test block 416), then selection routes to block 418. Block 418 chooses the optimal set of ME block combination with reference pictures and motion vectors as the best prediction from the inter prediction of the macroblock. If $COST_{MB\_SKIP} < T$ (YES in test block 416), then block 417 chooses the skip prediction mode as the best prediction from the inter-prediction of the macroblock. Block 419 stores for purposes of later processing (block 401) the optimal prediction mode and cost values $MODE_{ref}$ and $COST_{ref}$ of the current block. End block 420 completes the inter prediction mode selection for the macroblock.

Figure 5A:
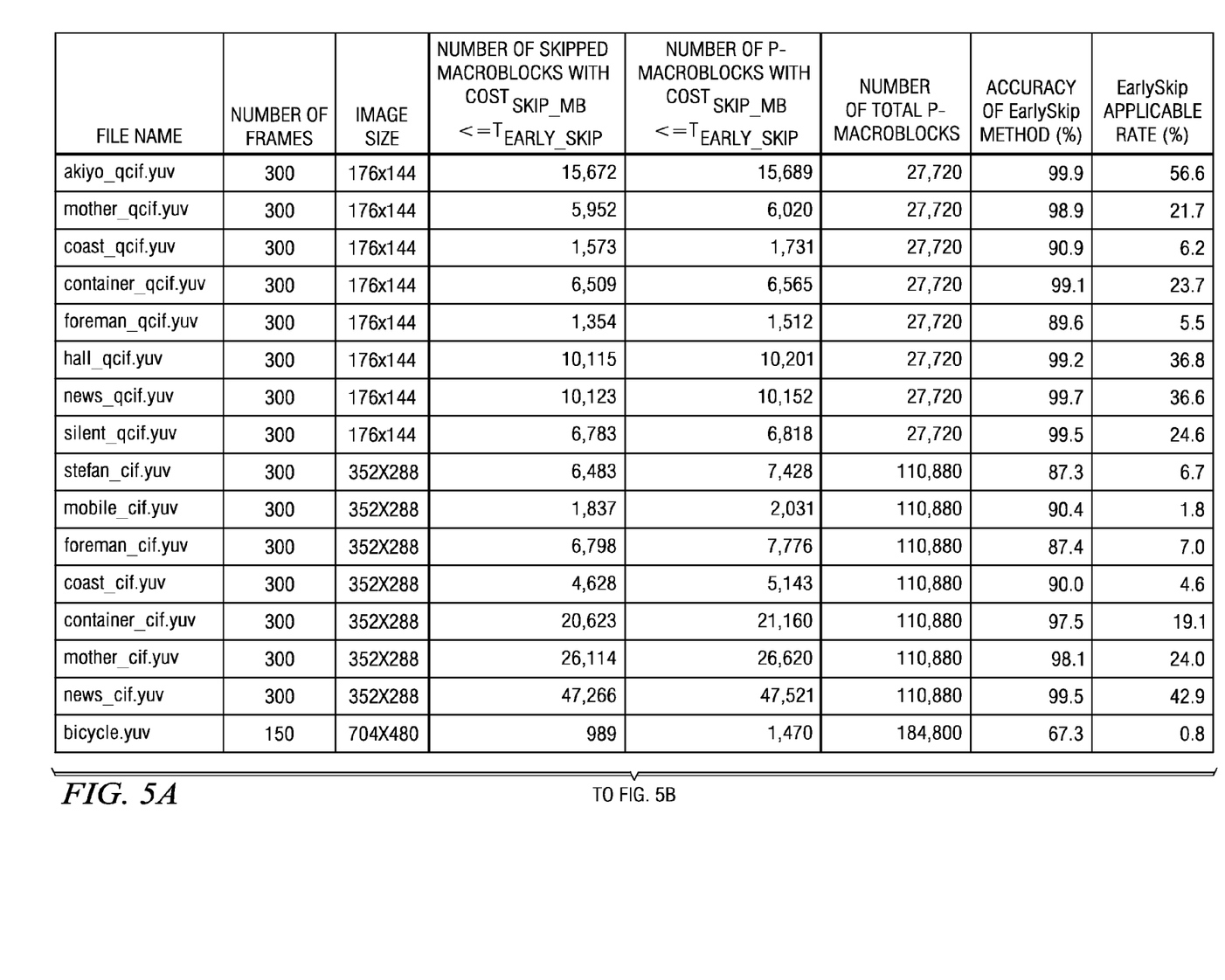
FIG. 5 illustrates a table of statistical data used to estimate the effect of EarlySkip method.
Figure 5B:
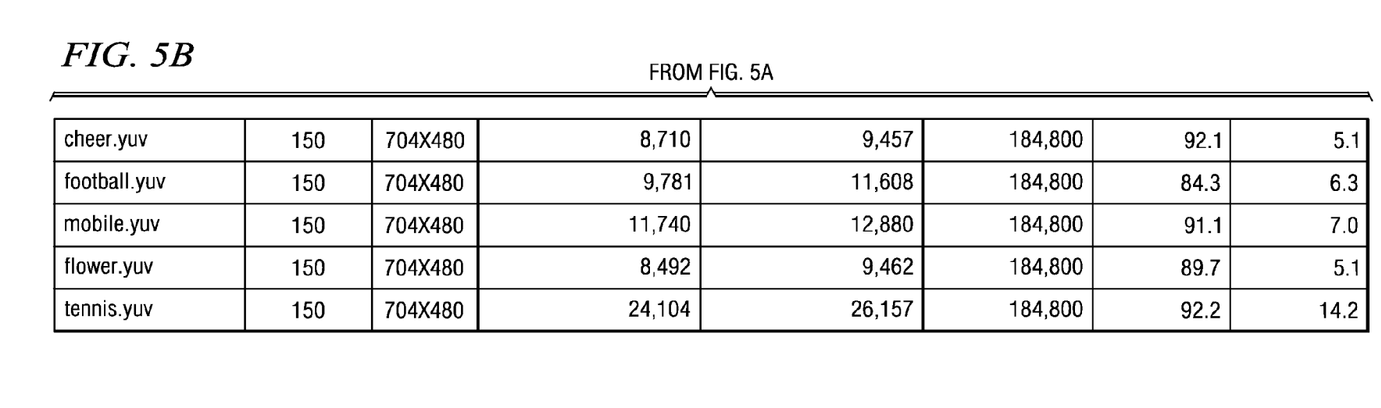
Figure 6:
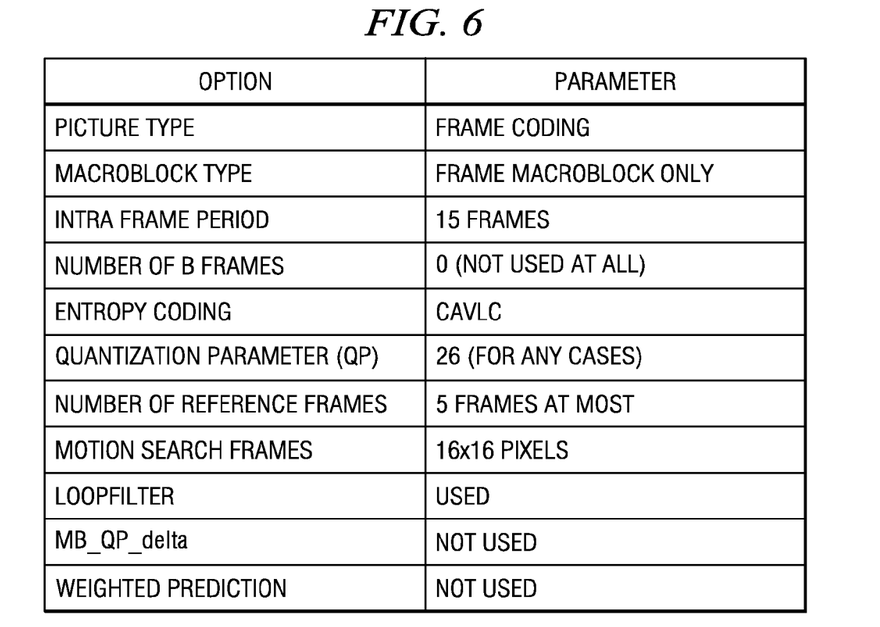
FIG. 6 illustrates a table of encoding options to collect the statistical data relating to EarlySkip.

FIG. 5 illustrates statistical evidence of the effectiveness of the EarlySkip method. FIG. 6 illustrates the coding options used in the various video sequences according to the ordinary inter-prediction process described in FIG. 1 (i.e. EarlySkip method is not applied) for the data presented in FIG. 5. For 21 images listed by file name, FIG. 5 illustrates the number of skipped macroblocks satisfying the condition $COST_{MB\_SKIP} \leq T_{EARLY\_SKIP}$, the number of total P-macroblocks satisfying the condition $COST_{MB\_SKIP} \leq T_{EARLY\_SKIP}$ and the total number of P-macroblocks where the parameter K=1 that is, $T_{EARLY\_SKIP} = COST_{ref}$, were counted. The number of P-macroblocks satisfying the condition equals to the number of P-macroblocks for which EarlySkip method is applied. Hence, the accuracy of EarlySkip method can be computed by dividing the number of skipped macroblocks satisfying the condition by the number of P-macroblocks satisfying the condition as shown in FIG. 5. Meanwhile, the rate that EarlySkip method is applied for a P-macroblock is computed by dividing the number of P-macroblocks satisfying the condition by the number of total P-macroblocks as also shown in FIG. 5.

The EarlySkip method has an accuracy over 80% in most cases. The only exception is bicycle.yuv. This image has an accuracy of 67.3%. For this image, the EarlySkip applicable rate is only 0.8%. This means that the EarlySkip method will not help much to reduce the required computation for ME in that case, but neither it will appreciably deteriorate the image quality. It is expected that the deterioration of image quality will be the primary disadvantage of the EarlySkip method. This will be considered further below. The EarlySkip method of this invention will reduce the computation required for ME of a macroblock with the possibility of an EarlySkip applicable rate ranging from 0.8% to 56.6% as shown in FIG. 5 for the example images. The accuracy of EarlySkip method is over 97% when the EarlySkip applicable rate is over 15%.

This invention will reduce the computation required for ME with a certain probability as described earlier in the text. This invention has possible negative effects, which may result from application of the methodology.

Figure 7:
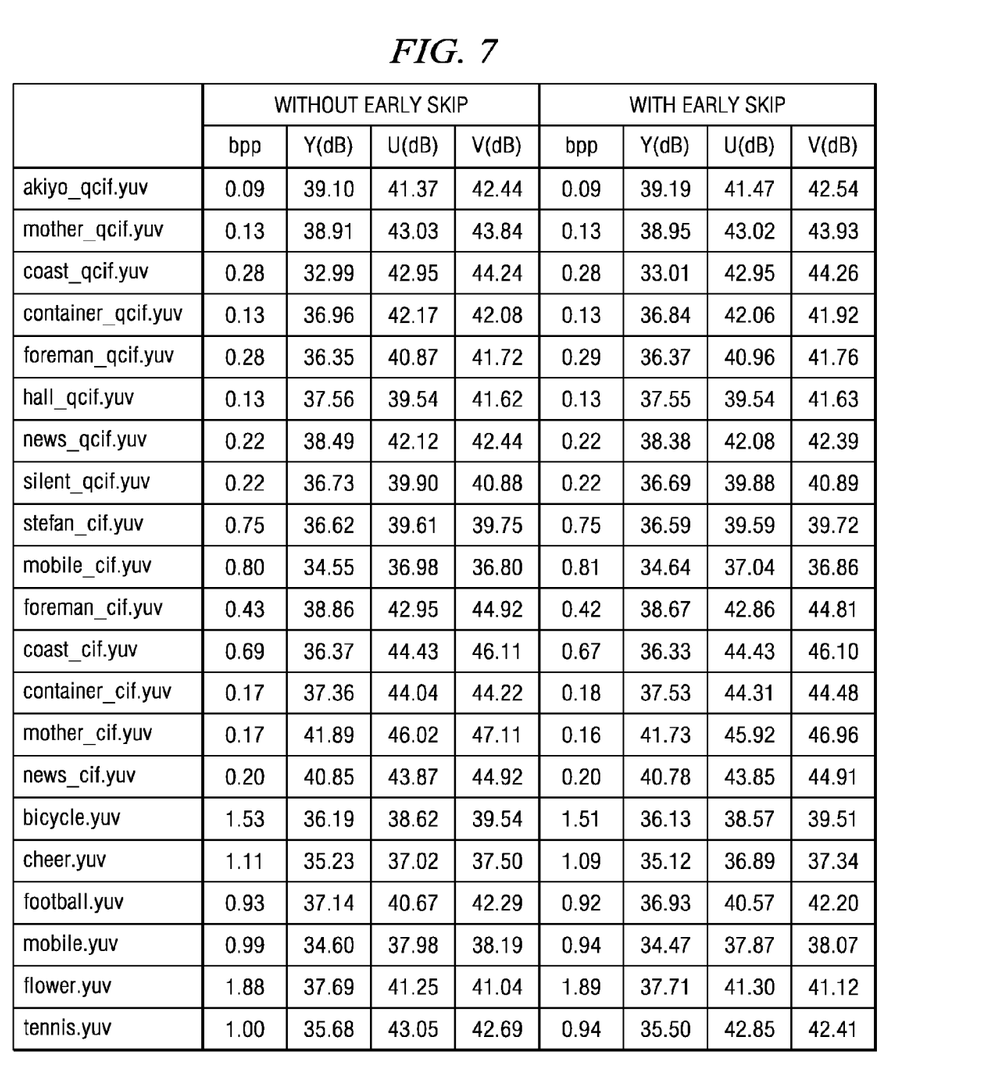
FIG. 7 illustrates in table form the contrasts of image quality and bit-rate data in both encoding methods, with or without EarlySkip.
Figure 8:
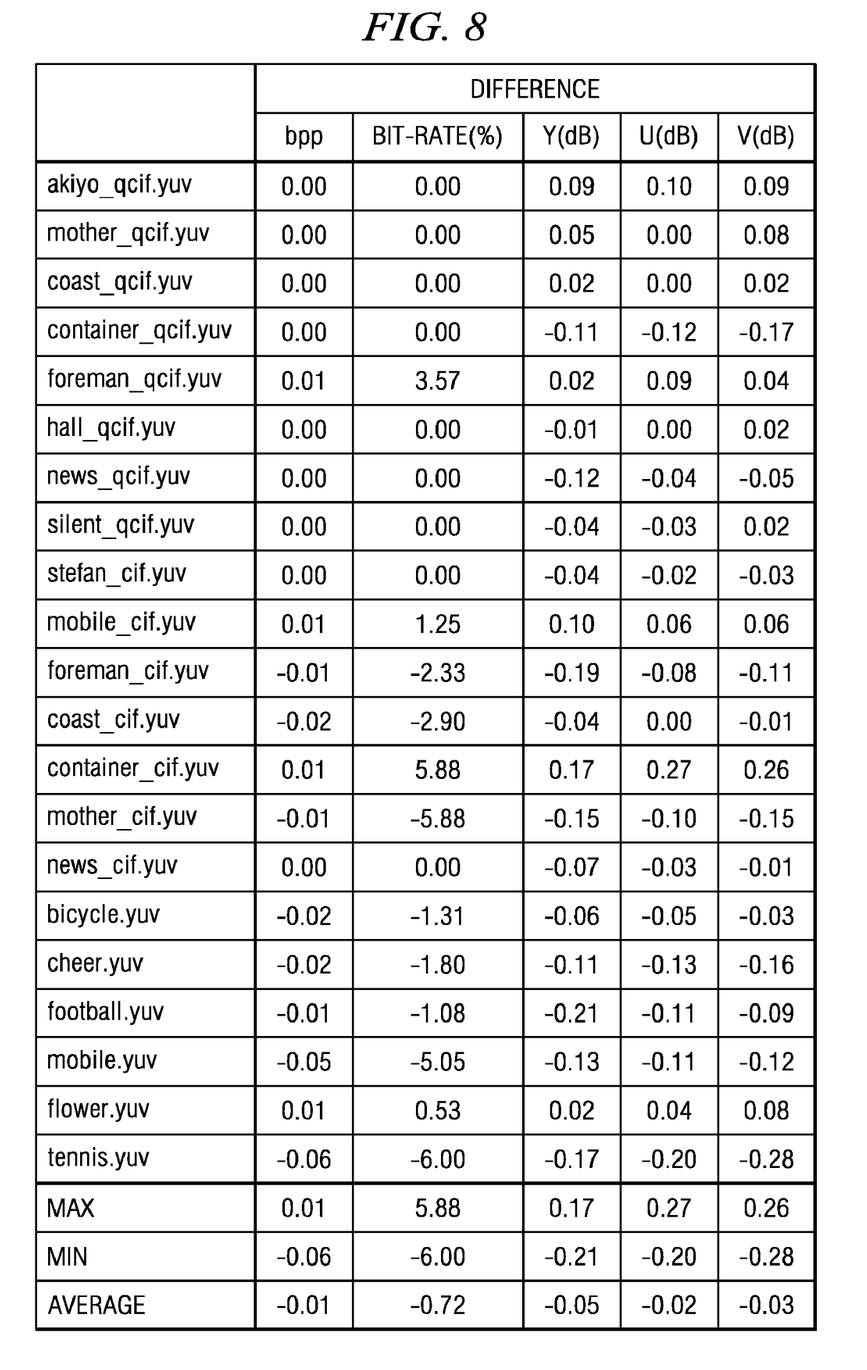
FIG. 8 illustrates in table form taken from encoded data files the relative image quality and bit rate effects of the EarlySkip method of encoding.

FIG. 7 illustrates a list of encoded image quality and bit-rate resulting in two cases: with or without EarlySkip method. Various video sequences were encoded with the coding options presented in FIG. 6 with or without applying the EarlySkip method. FIG. 8 illustrates the effect of EarlySkip method as the difference of image quality and bit-rate with and without the method is described in the table. According to FIG. 8, the worst case for EarlySkip method is when football.yuv is encoded because image quality of the luma component deteriorates by 0.21 (dB). However, the image quality deterioration due to the EarlySkip method is around 0.2 (dB) even in the worst case and 0.05 (dB) on average. This is quite small when compared to the benefit received. In some cases such as akiyo_qcif.yuv, the image quality even improves. The EarlySkip method reduces the bit-rate of encoded bit-stream by about 0.72% on average because some macroblocks are skipped extra due to the inaccuracy of the method.

In conclusion, both the positive and the negative effects of the invention are listed as follows:

(A) The amount of computation required for ME is reduced by 0.8% to 56.6% (about 17.0% on average);

(B) The image quality (luma component) deteriorates by 0.05 dB on average and 0.21 dB at worst for these examples; and C) The bit-rate of encoded stream is reduced by 0.72% on average.

What is claimed is:

1. A method of video encoding for video data compression, said method reducing the complexity of computation required for macroblock motion vector encoding in video compression for a current macroblock by determining selection of a normal motion vector encoding mode or a skip prediction mode comprising the steps of:
   computing a skip cost value;
   computing an early skip threshold value from the cost value of a corresponding macroblock in a prior picture;
   comparing the skip cost value to said early skip threshold value;
   if the skip cost value is less than the early skip threshold, then selecting a skip prediction mode for macroblock motion vector encoding of the current macroblock; and
   if the skip cost value is greater than the early skip threshold, then performing normal motion estimate vector encoding of the current macroblock.

2. The method of claim 1, wherein:
   said step of computing the early skip threshold value includes multiplying the cost value of the corresponding macroblock in the prior picture by a constant K dependent upon encoder implementation.

3. A method of video encoding for video data compression, said method reducing the complexity of computation required for macroblock motion vector encoding of a current macroblock in video compression by determining selection of a normal motion vector encoding mode or a skip prediction mode comprising the steps of:
   computing a skip cost value;
   obtaining an indication of a prediction mode of a corresponding macroblock in a prior picture;
   if the prediction mode of the corresponding macroblock in the prior picture is a skip mode, then
      computing an early skip threshold value from the cost value of the corresponding macroblock in the prior picture;
      comparing the skip cost value to said early skip threshold value;
      if the skip cost value is less than the early skip threshold, then selecting a skip prediction mode for macroblock motion vector encoding of the current macroblock, and
      if the skip cost value is greater than the early skip threshold, then performing ordinary block motion estimate vector encoding of the current macroblock; and
   if the prediction mode of the corresponding macroblock in the prior picture is not a skip mode, then performing ordinary block motion estimate vector encoding of the current macroblock.

4. The method of claim 3, wherein:
   said step of computing the early skip threshold value includes multiplying the cost value of the corresponding macroblock in the prior picture by a constant K dependent upon the encoder implementation.

* * * * *